(12) United States Patent
Kojima

(10) Patent No.: US 6,722,332 B2
(45) Date of Patent: Apr. 20, 2004

(54) APPARATUS AND METHOD FOR VEHICULAR ENGINE START CONTROL

(75) Inventor: Masakiyo Kojima, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 91 days.

(21) Appl. No.: 09/983,468

(22) Filed: Oct. 24, 2001

(65) Prior Publication Data

US 2002/0050259 A1 May 2, 2002

(30) Foreign Application Priority Data

Oct. 26, 2000 (JP) ........................ 2000-327672

(51) Int. Cl.$^7$ .................... B60K 6/00; F02D 29/06
(52) U.S. Cl. .................. 123/179.3; 180/65.2; 701/22
(58) Field of Search ................. 123/179.1, 179.3, 123/179.28, 339.14, 339.19; 180/65.2; 701/22, 113

(56) References Cited

U.S. PATENT DOCUMENTS 6,083,139 A * 7/2000 Deguchi et al. ........... 180/65.2
6,253,127 B1 * 6/2001 Itoyama et al. ............... 701/22

FOREIGN PATENT DOCUMENTS

| JP | A 9-164851 | 6/1997 |
| JP | A 10-331749 | 12/1998 |
| JP | A 11-205907 | 7/1999 |
| JP | A 2000-71815 | 3/2000 |
| JP | 2002-225859 | 8/2000 |

* cited by examiner

Primary Examiner—Henry C. Yuen
Assistant Examiner—Arnold Castro
(74) Attorney, Agent, or Firm—Oliff & Berridge, PLC

(57) ABSTRACT

An apparatus and method for controlling an internal combustion engine of a vehicle during the running of the vehicle. When an engine start request is made in order to use an engine as a drive power source during the running of the vehicle in an engine stopped state, the engine is cranked by a starter without supply of fuel to the engine. The torque of the starter is controlled so that the engine revolution speed becomes equal to the input shaft rotation speed to create a synchronous rotation speed. After synchronization is achieved and the engagement of a clutch is completed, the fuel injection control of the engine is started to cause self-driven revolution based on explosion. The process reduces the wasteful consumption of fuel and the production of exhaust gas.

17 Claims, 7 Drawing Sheets

FIG. 4

| RANGE | MODE | ENGAGEMENT ELEMENT | C1 | C2 | B1 |
|---|---|---|---|---|---|
| B,D | ETC MODE | | × | ○ | × |
| B,D | LOCKED-UP MODE | | ○ | ○ | × |
| B,D | MOTOR RUN MODE (FORWARD) | | ○ | × | × |
| N,P | NEUTRAL | | × | × | × |
| N,P | CHARGE, ENGINE START | | × | × | ○ |
| R | MOTOR RUN MODE (REVERSE) | | ○ | × | × |
| R | FRICTION RUN MODE | | ○ | × | ○ |

APPARATUS AND METHOD FOR VEHICULAR ENGINE START CONTROL

INCORPORATION BY REFERENCE

The disclosure of Japanese Patent Application No. 2000-327672 filed on Oct. 26, 2000, including the specification, drawings and abstract, is incorporated herein by reference in its entirety.

BACKGROUND OF THE INVENTION

1. Field of Invention

The invention relates to a vehicular engine start control apparatus and method. Specifically, a control process of starting an internal combustion engine of a vehicle during the running of the vehicle is disclosed. The invention also relates to a fuel injection apparatus and control method of an internal combustion engine.

2. Description of Related Art

A known hybrid vehicle has: (a) a drive electric motor for propelling a vehicle by turning a wheel; (b) an internal combustion engine for propelling the vehicle by turning a wheel via a power connection/disconnection mechanism; and (c) a starter electric motor for turning the internal combustion engine when the engine is to be started. An example of such a vehicle is described in Japanese Patent Application Laid-Open No. 2000-71815, in which a drive electric motor (motor 4) is connected to an internal combustion engine (engine 2) via a power connection/disconnection mechanism (clutch 3). If an internal combustion engine start request is output while the vehicle is running in a state in which the power connection/disconnection mechanism has been disconnected and the engine has been stopped, the internal combustion engine is started by turning, i.e., cranking the engine through the use of the starter electric motor (motor 1) and by supplying fuel to the engine.

After the engine is started, the starter electric motor is controlled so that the input rotation speed and the output rotation speed of the power connection/disconnection mechanism become substantially synchronous. After the input and output rotation speeds of the power connection/disconnection mechanism become substantially synchronous, the power connection/disconnection mechanism is connected and the control of synchronizing the input and output rotation speeds through the use of the starter electric motor is stopped. Thus, output of the internal combustion engine is transferred to a drive wheel to run the vehicle.

However, if fuel is supplied to the internal combustion engine to start the engine before the power connection/disconnection mechanism is connected, fuel is consumed wastefully without contributing to the running of the vehicle, so that the fuel efficiency is not very high, and exhaust gas is produced corresponding to the wasteful fuel consumption. Furthermore, the synchronizing control is performed while the engine is in operation. Therefore, further problems occur. That is, due to torque fluctuations of the internal combustion engine or the like, the rotation speed control through the use of the starter electric motor becomes rather difficult, and a longer time is required before the synchronization is achieved. Therefore, the wasteful fuel consumption further increases.

SUMMARY OF THE INVENTION

Accordingly, it is an object of the invention to minimize the wasteful consumption of fuel and the production of exhaust gas that occur before a power connection/disconnection mechanism is connected in conjunction with the starting of an internal combustion engine during the running of the vehicle.

To achieve the aforementioned and other objects, a vehicular engine start control apparatus in accordance with the invention includes: (a) an internal combustion engine that propels a vehicle by turning a wheel via a power connection/disconnection mechanism; (b) a starter electric motor that turns the internal combustion engine when the internal combustion engine is to be started; and (c) a control unit that operates as follows.

When a request for starting the internal combustion engine occurs during a run of the vehicle in an engine stopped state, where the power connection/disconnection mechanism is disconnected and the internal combustion engine is stopped, the control unit turns the internal combustion engine by using the starter electric motor without causing explosion in the internal combustion engine. Furthermore, the control unit controls the starter electric motor so that an input rotation speed of the power connection/disconnection mechanism and an output rotation speed of the power connection/disconnection mechanism become substantially synchronous. The control unit also controls the internal combustion engine to have a self-driven revolution based on explosion by supplying a fuel to the internal combustion engine after the input rotation speed and the output rotation speed of the power connection/disconnection mechanism become substantially synchronous, and the power connection/disconnection mechanism is connected.

To achieve the aforementioned and other objects, the invention provides a control method of a vehicular engine start control apparatus including an internal combustion engine that propels a vehicle by turning a wheel via a power connection/disconnection mechanism, and a starter electric motor that turns the internal combustion engine when the internal combustion engine is to be started.

The control method includes the steps of turning the internal combustion engine by using the starter electric motor without causing explosion in the internal combustion engine. This step occurs when a request for starting the internal combustion engine occurs during a run of the vehicle in an engine stopped state where the power connection/disconnection mechanism is disconnected and the internal combustion engine is stopped.

The control method also controls the starter electric motor so that an input rotation speed of the power connection/disconnection mechanism and an output rotation speed of the power connection/disconnection mechanism become substantially synchronous.

The control method further connects the power connection/disconnection mechanism.

Finally, the control method causes the internal combustion engine to have a self-driven revolution based on explosion by supplying a fuel to the internal combustion engine.

According to the vehicular engine start control apparatus and the control method thereof as described above, if the internal combustion engine start request occurs during the running of the vehicle in an engine stopped state, where the power connection/disconnection mechanism is disconnected and the internal combustion engine is stopped, the internal combustion engine is turned by using the starter electric motor without causing explosion in the engine. Moreover, the starter electric motor is controlled so that the input and output rotation speeds of the power connection/ disconnection mechanism become substantially synchronous. After the input and output rotation speeds of the power connection/disconnection mechanism become substantially synchronous and the power connection/disconnection mechanism is connected, i.e., after the engine is connected to the drive wheel via the power connection/disconnection mechanism, the engine is caused to have self-driven revolution based on explosion by supplying fuel to the engine. Therefore, the problems associated with wasteful consumption of fuel that does not contribute to the running of the vehicle and the corresponding production of exhaust gas are eliminated.

BRIEF DESCRIPTION OF THE DRAWINGS

The above mentioned and other objects, features, advantages, technical and industrial significance of this invention will be better understood by reading the following detailed description of the preferred embodiments of the invention, when considered in connection with the accompanying drawings, in which:

FIG. 4 is a diagram showing relationships between various operation modes entered in the hybrid vehicle drive control apparatus and operation conditions of clutches and a brake;

DETAILED DESCRIPTION OF PREFERRED EMBODIMENTS

Figure 1:
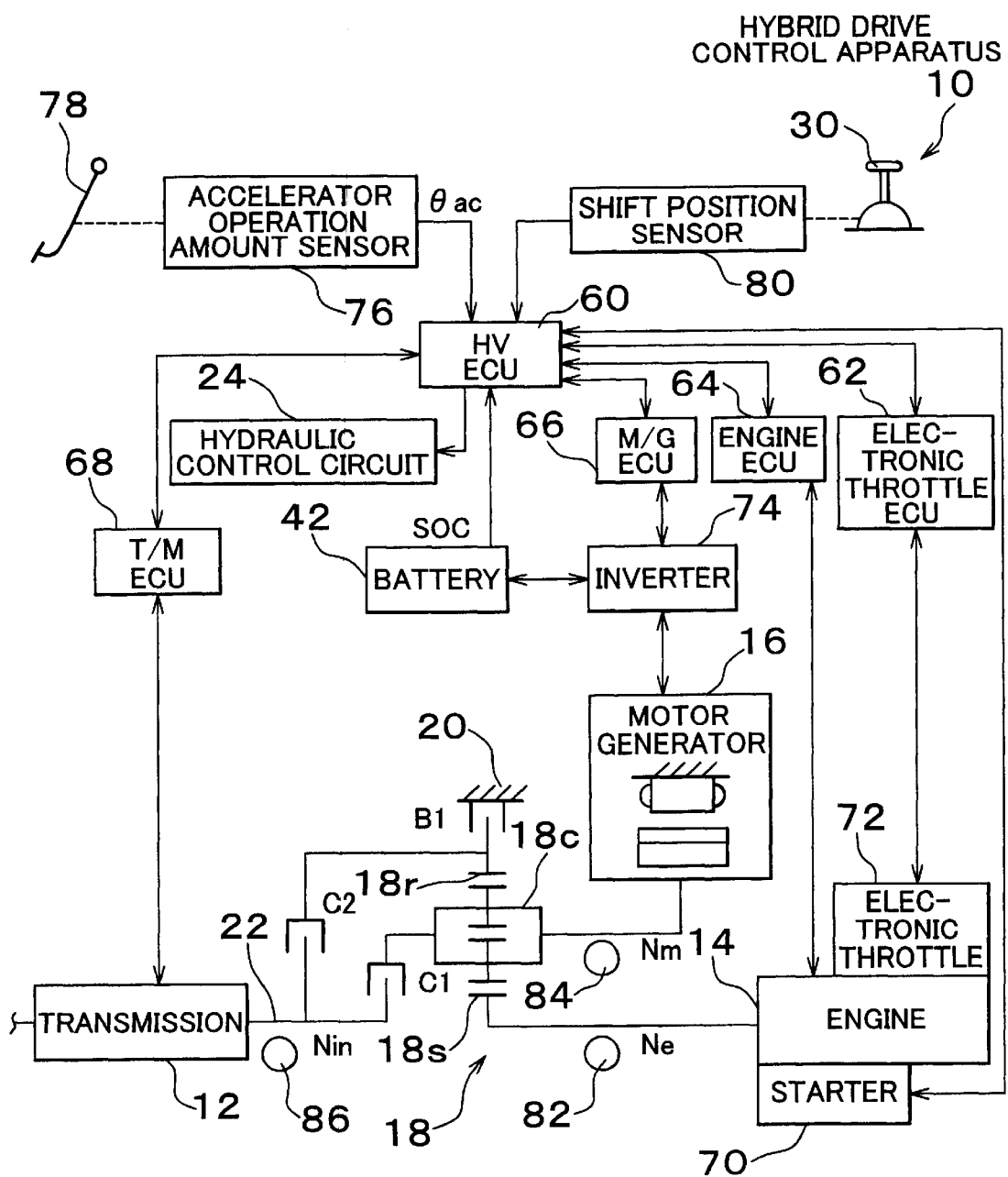
FIG. 1 is a diagram illustrating a construction of a hybrid drive control apparatus according to the invention.

In the following description and the accompanying drawings, the invention will be described in more detail with reference to exemplary embodiments.

The invention is applicable to various vehicle controls. For example, a control in which an internal combustion engine is stopped and is restarted under a predetermined condition during the running of the vehicle. The invention is suitably applicable to, for example, a case where, in a hybrid vehicle having: (a) a drive electric motor for propelling the vehicle by turning wheels (which may be a motor generator that is usable as an electric power generator as well); (b) an internal combustion engine for propelling the vehicle by turning wheels via a power connection/disconnection mechanism; and (c) a starter electric motor for turning the internal combustion engine to start the engine. In this situation, the vehicle running mode is switched from a motor run mode in which only the drive electric motor is used as a drive power source (engine stopped mode) to an engine run mode in which the internal combustion engine and the drive electric motor or only the engine is used as a drive power source. The internal combustion engine stopped mode may be a regenerative braking mode in which regenerative control of the generator is performed to charge a battery and apply a braking force to the vehicle.

The power connection/disconnection mechanism connects, i.e., transfers, and disconnects the transfer of power. A hydraulic or electromagnetic friction clutch or friction brake may be suitably used as a power connection/disconnection mechanism. It is also possible to use, for example, a claw clutch equipped with a synchronizing mechanism as well. In the case of a hybrid vehicle, the power connection/disconnection mechanism may include, for example, a combination-distribution mechanism such as a planetary gear unit or the like.

For example, a hybrid vehicle may have: (a) a double-pinion type planetary gear unit whose sun gear is connected to an internal combustion engine and whose carrier is connected to a motor generator (corresponding to a drive electric motor); (b) a first brake for connecting a ring gear of the planetary gear unit to a case; (c) a first clutch for connecting the carrier to a wheel-side transmission; and (d) a second clutch for connecting the ring gear to the transmission.

In this situation, a power connection/disconnection mechanism is formed by the planetary gear unit, the first clutch, the second clutch and the first brake, although elements vary depending on the vehicle running mode. For example, the mode is switched from a motor run mode (engine stopped mode) in which the first clutch is engaged and the second clutch and the first brake are released. Here, the vehicle is run by the motor generator to an engine run mode in which the first clutch and the second clutch are engaged and the first brake is released and therefore the vehicle is run by the internal combustion engine. During the motor run mode, power transfer between the engine and the wheels is disconnected since the second clutch and the first brake are released.

The synchronization of the power connection/disconnection mechanism refers to not merely a case where the input and output rotation speeds of the mechanism become equal, but also a case where the rotation speed of the ring gear becomes substantially zero after the internal combustion engine is started at the time of a mode shift from an engine stopped mode to an engine run mode. Here, the first clutch is engaged and the first brake and the second clutch are released and the engine is stopped, and control shifts to an engine run mode in which the first clutch and the first brake are engaged and the second clutch is released and the vehicle is run in the reverse direction by the engine. When such a state of zero rotation of the ring gear is established, the first brake may be engaged. In that case, the input rotation speed of the power connection/disconnection mechanism, i.e., the revolution speed of the engine, and the output rotation speed of the mechanism, i.e., the input rotation speed of the transmission or the like, are not equal to each other. Thus, the synchronization of the power connection/disconnection mechanism includes a case where the input and output rotation speeds are not equal. However, if a different type of power connection/disconnection mechanism, for example, an ordinary power connection/disconnection mechanism formed by a single clutch, is adopted, the input and output rotation speeds of the power connection/disconnection mechanism equal when the synchronization is achieved.

The starter electric motor may be used exclusively for cranking, i.e., turning, the internal combustion engine to start the engine, or may be used for driving other elements such as accessories and the like. Furthermore, the starter electric motor may be a motor generator that is used as an electric power generator as well.

A request for starting the engine occurs, for example, when the vehicle is to be run by using the engine as a drive power source, when the vehicle speed or the accelerator operation amount becomes equal to or greater than a predetermined value, or when the amount of charge of the battery falls to or below a predetermined value so that the drive electric motor cannot be used.

A synchronization control means is designed, for example, to feedback-control the torque of the starter electric motor so that the rotation speed of the starter electric motor reaches a rotation speed that achieves substantial synchronization between the input and output rotation speeds of the power connection/disconnection mechanism.

Figure 2:
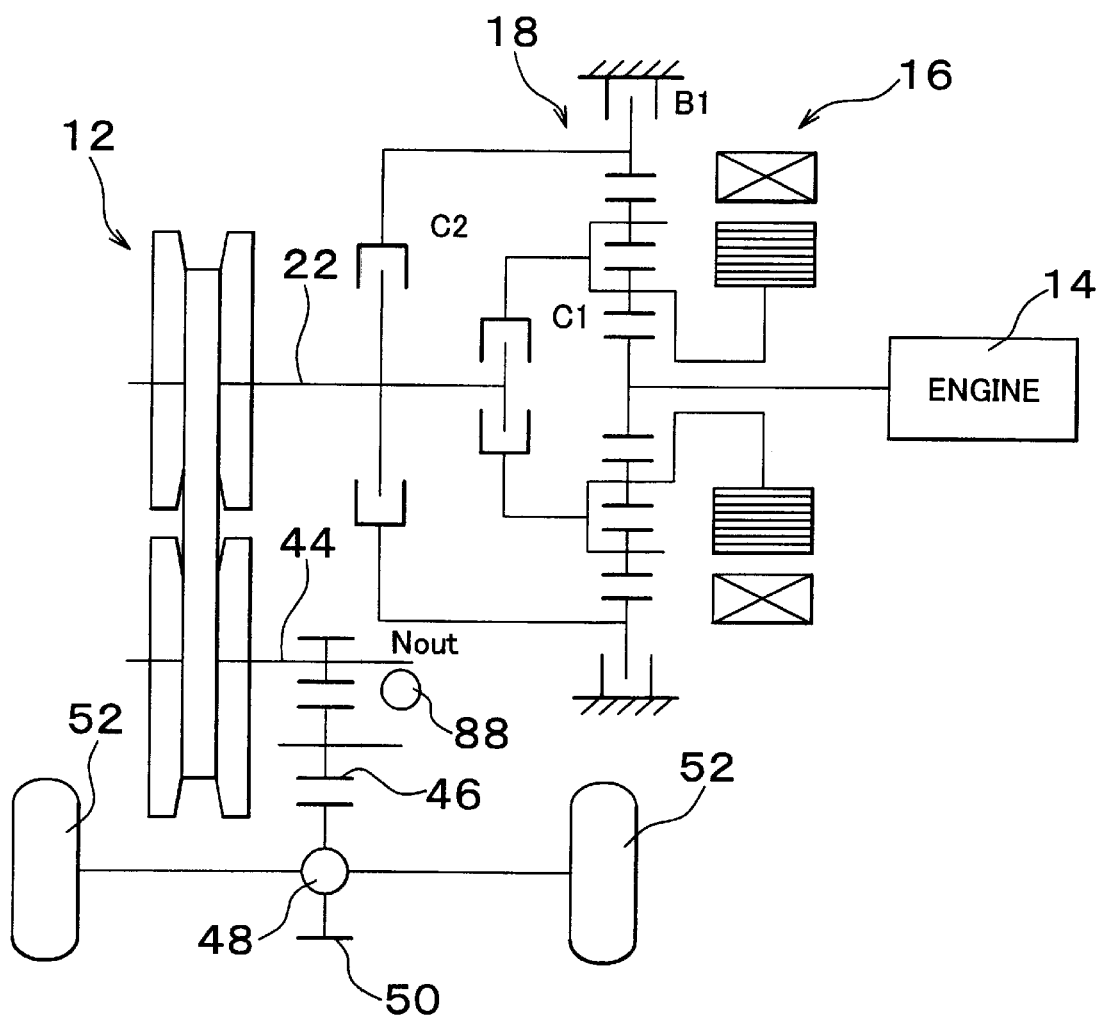
FIG. 2 is a diagram showing a power transfer system of the hybrid vehicle drive control apparatus shown in FIG. 1.

Embodiments of the invention will be described in detail hereinafter with reference to the drawings. FIG. 1 is a schematic diagram illustrating a construction of a hybrid drive control apparatus 10 to which the invention is applied. FIG. 2 is a skeleton diagram illustrating a transmission 12. The hybrid drive control apparatus 10 includes an engine 14, that is an internal combustion engine that produces power through combustion of fuel. A motor generator 16 is used as an electric motor and an electric power generator, and a double-pinion type planetary gear unit 18 is connected to the motor generator 16. A sun gear 18s of the planetary gear unit 18 is connected to the engine 14, and a carrier 18c thereof is connected to the motor generator 16. A ring gear 18r of the planetary gear unit 18 is connectable to a case 20 via a first brake B1. The carrier 18c is connected to an input shaft 22 of the transmission 12 via a first clutch C1. The ring gear 18r is connectable to the input shaft 22 via a second clutch C2. The motor generator 16 corresponds to a drive electric motor. The planetary gear unit 18 corresponds to a gear-type combination/distribution device. The sun gear 18s, the carrier 18c and the ring gear 18r correspond to a first rotating element, a second rotating element and a third rotating element, respectively. The planetary gear unit 18, together with the first brake B1, the first clutch C1 and the second clutch C2, forms a power connection/disconnection mechanism.

Figure 3:
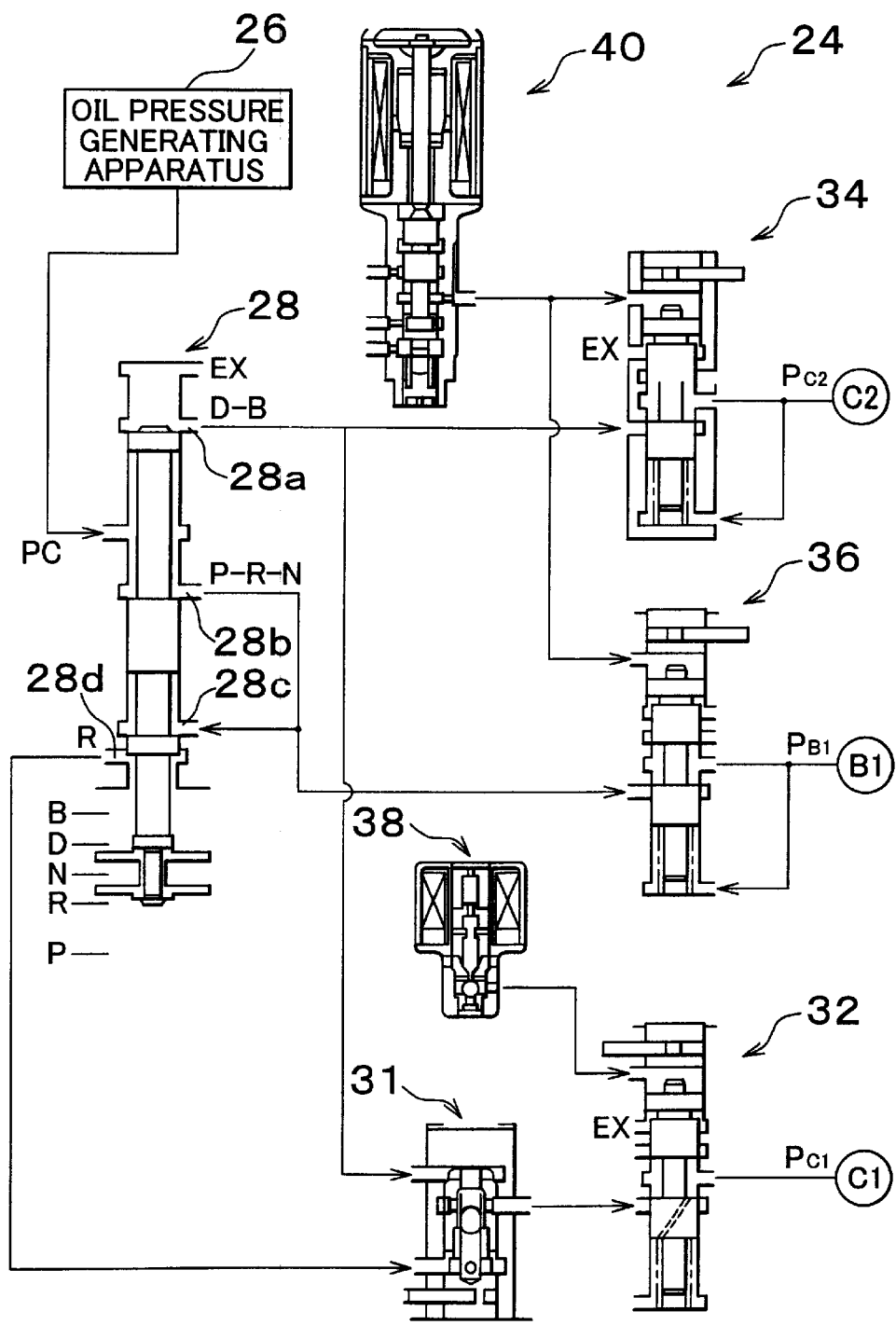
FIG. 3 is a diagram illustrating a portion of a hydraulic control circuit shown in FIG. 1.

The clutches C1, C2 and the first brake B1 are multi-plate wet type hydraulic friction engagement devices that are put into friction engagement by hydraulic actuators. The friction engagement of these devices is achieved by hydraulic oil supplied from a hydraulic control circuit 24. FIG. 3 shows portions of the hydraulic control circuit 24. An electrically driven oil pressure generating apparatus 26 including an electric pump produces a source pressure PC, which is supplied to the clutches C1, C2 and the first brake B1 in accordance with the position of a shift lever 30 (see FIG. 1) via a manual valve 28. The shift lever 30 is a speed shift operating member that is disposed near a driver's seat and is operated by a driver to select a transmission speed. In this embodiment, the shift lever 30 can be selectively operated to five shift positions of "B", "D", "N", "R" and "P". The manual valve 28 is connected to the shift lever 30 via a cable, a link or the like, and can be mechanically switched in accordance with the operation of the shift lever 30.

The "B" position is a shift position at which a relatively great power-source braking force is produced upon a downshift of the transmission 12 or the like. The "D" position is a shift position for forward drive of the vehicle. When the shift lever 30 is at either one of these shift positions, the source pressure PC is supplied from an output port 28a of the manual valve 28 to the clutches C1 and C2. The source pressure PC is supplied to the first clutch C1 via a shuttle valve 31. The "N" range is a shift position for disconnecting the power transfer from a power source. The "R" position is a shift position for reverse drive of the vehicle. The "P" position is a shift position at which the power transfer from the power source is disconnected, and rotation of drive wheels is mechanically prevented by a parking lock device (not shown). When the shift lever 30 is at any one of these shift positions, the source pressure PC is supplied to the first brake B1 via an output port 28b. The source pressure PC outputted from the output port 28b is inputted to a return port 28c as well. When the shift lever 30 is at the "R" position, the source pressure PC is supplied to the first clutch C1 via the return port 28c, an output port 28d and the shuttle valve 31.

The clutches C1, C2 and the first brake B1 are provided with control valves 32, 34, 36, respectively, whereby the oil pressures $P_{C1}$, $P_{C2}$, $P_{B1}$ thereof are controlled. The oil pressure $P_{C1}$ of the first clutch C1 is regulated by an on-off valve 38. The oil pressures $P_{C2}$, $P_{B1}$ of the second clutch C2 and the first brake B1 are regulated by a linear solenoid valve 40.

Various vehicle running modes shown in FIG. 4 are established in accordance with the states of operation of the clutches C1, C2 and the first brake B1. That is, at the "B" range or the "D" range, one of an ETC mode, a locked-up mode, and a motor run mode (forward) is established. In the ETC mode, the second clutch C2 is engaged and the first clutch C1 and the first brake B1 are released, and the engine 14 and the motor generator 16 are operated to run the vehicle forward. In the locked-up mode, the clutches C1, C2 are engaged and the first brake B1 is released, and an engine run operation of running the vehicle forward can be performed by operating the engine 14, or an engine-motor run of running the vehicle can be performed by operating the engine 14 and the motor generator 16. In the motor run mode (forward), the first clutch C1 is engaged and the second clutch C2 and the first brake B1 are released, and a motor run mode of running the vehicle forward can be performed by operating the motor generator 16. In the motor run mode (forward), a regenerative run operation of generating electric power from kinetic energy of the vehicle to charge a battery 42 (see FIG. 1) and produce a braking force for the vehicle can be performed through a regenerative control of the motor generator 16, for example, when the accelerator is off.

Figure 5A:
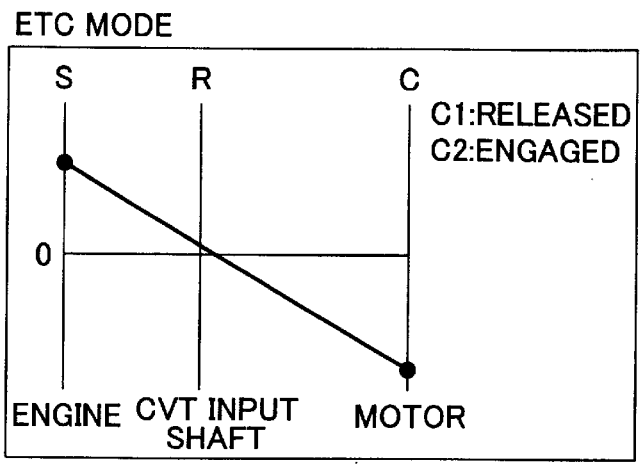
FIG. 5a is a figure indicating a relationship among the rotation speeds of rotating elements of a planetary gear unit in an ETC mode.
Figure 5B:
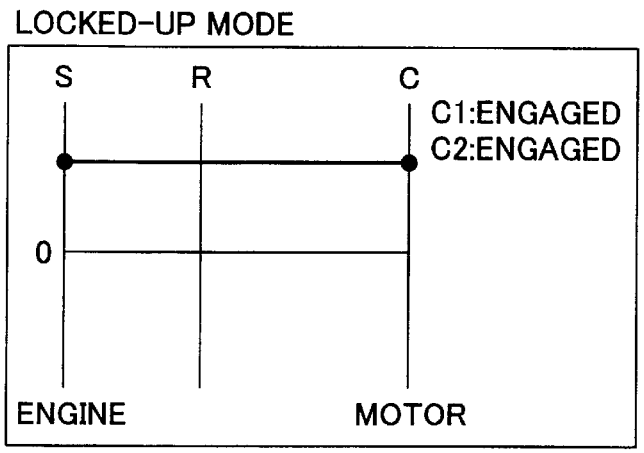
FIG. 5b is a figure indicating a relationship among the rotation speeds of the rotating elements of the planetary gear unit in a locked-up mode.
Figure 5C:
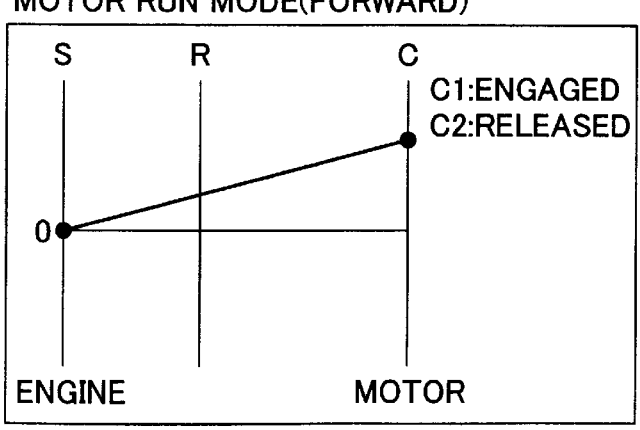
FIG. 5c is a figure indicating a relationship among the rotation speeds of the rotating elements of the planetary gear unit in a motor run mode.

FIGS. 5a, 5b and 5c indicate operation states of the planetary gear unit 18 during the aforementioned forward drive modes. In the nomograms, "S" represents the sun gear 18s, and "R" represents the ring gear 18r, and "C" represents the carrier 18c. The intervals between lines "S", "R" and "C" are determined by a gear ratio ρ(=the number of teeth of the sun gear 18s/the number of teeth of the ring gear 18r). More specifically, assuming that the interval between "S" and "C" is 1, the interval between "R" and "C" becomes ρ, which is about 0.6 in this embodiment. The torque ratio during the ETC mode in FIG. 5a is engine torque Te:CVT input shaft torque Tin:motor torque Tm=ρ:1:1−ρ. Thus, the motor torque Tm needed is less than the engine torque Te needed.

During a steady state, the torque obtained by summing the motor torque Tm and the engine torque Te becomes equal to the CVT input shaft torque Tin. The "CVT" means a continuously variable transmission. In this embodiment, the transmission 12 is a belt-type continuously variable transmission.

Referring back to FIG. 4, when the "N" range or the "P" range is selected, either one of a neutral state and a charge-engine start mode is established. During the neutral state, the clutches C1, C2 and the first brake B1 are released. During the charge-engine start mode, the clutches C1, C2 are released and the first brake B1 is engaged, and the motor generator 16 is reversely operated to start the engine 14, or the motor generator 16 is turned by the engine 14 via the planetary gear unit 18. Furthermore, the regenerative control of the motor generator 16 is performed to charge the battery 42 (see FIG. 1).

When the "R" range is selected, a motor run mode (reverse) or a friction run mode is established. In the motor run mode (reverse), the first clutch C1 is engaged and the second clutch C2 and the first brake B1 are released, and a motor reverse run operation of running the vehicle backward can be performed by reversely turning the motor generator 16 to reversely turn the carrier 18c and the input shaft 22. The friction run mode is entered if an assist request is outputted during the reverse running in the motor run mode (reverse). In the friction run mode, the engine 14 is started to turn the sun gear 18s forward. While the ring gear 18r is turning forward as the sun gear 18s is turning, the first brake B1 is put into a slip engagement to restrict the rotation of the ring gear 18r, so that a reverse rotating force acts on the carrier 18c thereby assisting the reverse running of the vehicle.

The transmission 12 is a belt-type continuously variable transmission. Power is transferred from an output shaft 44 of the transmission 12 to a ring gear 50 of a differential device 48 via a counter gear 46. The differential device 48 distributes power to right and left-side drive wheels 52.

The hybrid drive control apparatus 10 of the embodiment changes the vehicle running mode through the use of an HV ECU 60 shown in FIG. 1. The HV ECU 60 includes a CPU, a RAM, a ROM, etc. The HV ECU 60 controls an electronic throttle ECU 62, an engine ECU 64, a motor-generator ECU 66, a transmission ECU 68, the on-off valve 38 of the hydraulic control circuit 24, the linear solenoid valve 40, a starter 70 of the engine 14, etc., in accordance with programs pre-stored in the ROM while using a temporarily memory function of the RAM. The starter 70 corresponds to a starter electric motor for cranking the engine 14 when the engine 14 is to be started. In this embodiment, a motor generator that functions as an electric motor and a generator is employed as the starter 70, and turns a crankshaft of the engine 14 via a belt.

The electronic throttle ECU 62 controls the opening and closure of an electronic throttle valve 72 of the engine 14. The engine ECU 64 controls the output of the engine 14 via the amount of fuel injected in the engine 14, a variable valve timing mechanism, an ignition timing, etc. The motor-generator ECU 66 controls the motoring torque, the regenerative braking torque and the like of the motor generator 16 via an inverter 74. The transmission ECU 68 controls the speed ratio γ(=input shaft rotation speed Nin/output shaft rotation speed Nout), the belt tension and the like of the transmission 12. The hydraulic control circuit 24 has a circuit for controlling, for example, the speed ratio γ and the belt tension of the transmission 12.

The HV ECU 60 is supplied with a signal from an accelerator operation amount sensor 76 indicating an operation amount θac of an accelerator pedal 78 provided as an accelerator operating member, and is supplied with a signal from a shift position sensor 80 indicating the operated position of the shift lever 30 (shift position). The HV ECU 60 is further supplied with signals from an engine revolution speed sensor 82, a motor rotation speed sensor 84, an input shaft rotation speed sensor 86 and an output shaft rotation speed sensor 88 indicating the engine revolution speed (number of rotations) Ne, the motor rotation speed (number of rotations) Nm, the input shaft rotation speed (rotation speed of the input shaft 22) Nin and the output shaft rotation speed (rotation speed of the output shaft 44) Nout, respectively. The output shaft rotation speed Nout corresponds to the vehicle speed V. Still further, the HV ECU 60 is supplied with various signals indicating states of operation, such as the amount of charge SOC of the battery 42 and the like. The amount of charge SOC may merely be a battery voltage. It is also possible to determine the amount of charge or discharge by successive accumulation. The accelerator operation amount θac represents the amount of output requested by a driving person.

Figure 6:
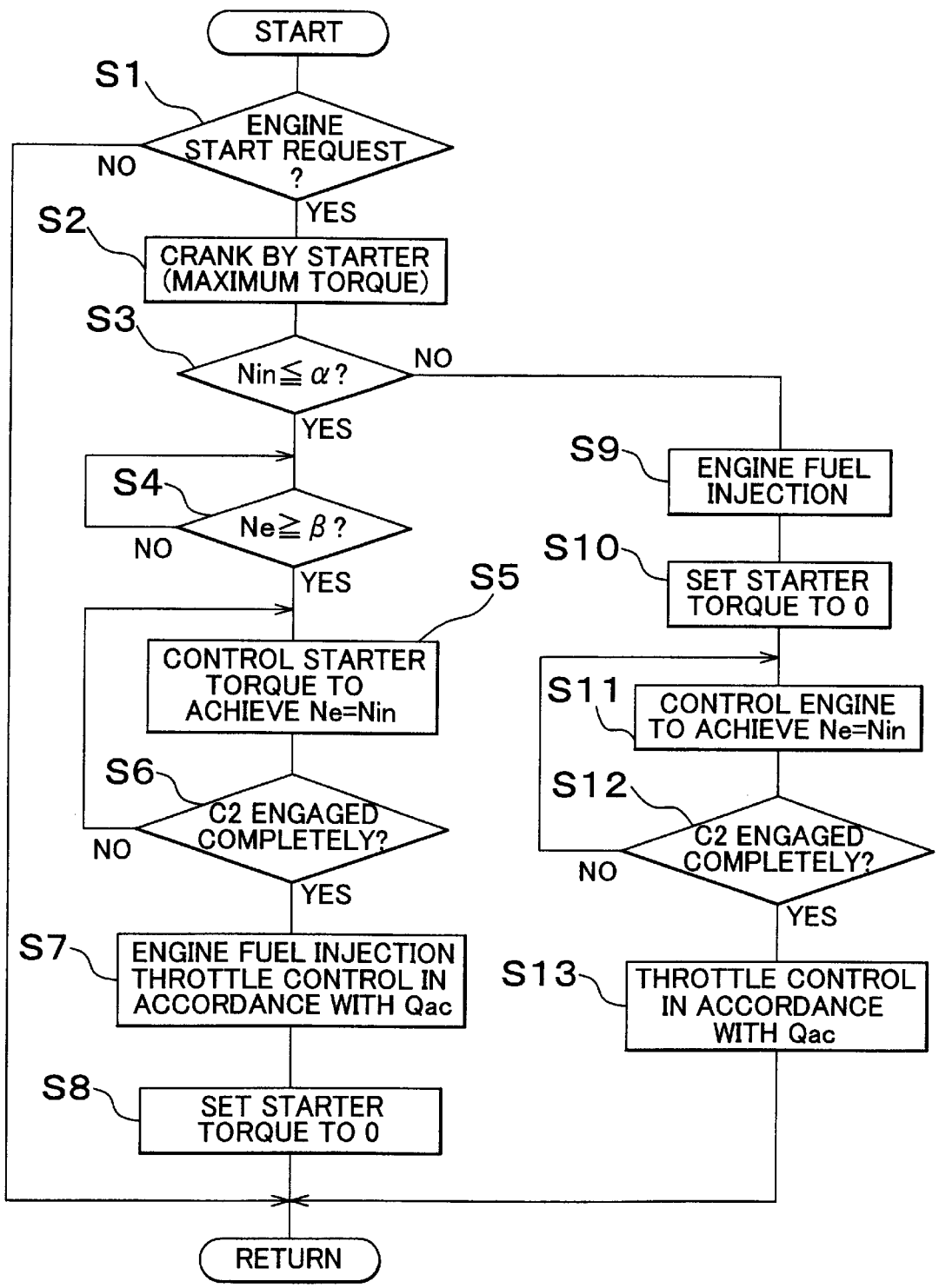
FIG. 6 is a flowchart illustrating an operation performed by the hybrid vehicle drive control apparatus when an engine start request is made during the forward running of the vehicle in an engine stopped state.

FIG. 6 is a flowchart illustrating an engine starting control process performed when an engine start request is output in order to use the engine 14 as a drive power source during the forward running of the vehicle in the motor run mode (forward) with the shift lever 30 operated to the "D" or "B" position. More specifically, the control process is performed during the running of the vehicle in an engine stopped state where the first clutch C1 is engaged and the second clutch C2 and the first brake B1 are released and the engine 14 is stopped, such as during the motor run in which the accelerator operation amount θac and the vehicle speed V are relatively small and only the motor generator 16 is used as a drive power source. The control process can also be performed during the regenerative run in which the vehicle is running with the accelerator being off while the battery 42 is being charged by the regenerative control of the motor generator 16. The engine start control is repeatedly executed in a cycle of a predetermined time through the signal processing performed by the HV ECU 60, the electronic throttle ECU 62, the engine ECU 64, etc.

In step S1 in FIG. 6, it is determined whether an engine start request has been output to use the engine 14 as a drive power source. If the engine start request has been output, the process starting at step S2 is executed. The engine start request occurs, for example, when during a motor run in which only the motor generator 16 is used as a drive power source, the accelerator operation amount θac or the vehicle speed V increases so that it is determined that the running of the vehicle is to be switched to the engine run or the engine-motor run. The request also occurs when, during a motor-driven run, the amount of charge SOC reduces so that it is determined that the vehicle running is to be switched to the engine-driven run. The request further occurs when, during a regenerative run based on the motor generator 16 with the accelerator being off and the engine 14 disconnected from the drive wheels 52, the accelerator pedal 78 is depressed so that it is determined that the vehicle running is to be switched to the engine-driven run, etc.

The aforementioned determination regarding the fashion of running of the vehicle is executed by the HV ECU 60 in such a manner that the engine start request is output only when the input shaft rotation speed Nin, which is a synchronous revolution speed of the engine 14, is greater than or equal to 1000 rpm, which is greater than the minimum engine revolution speed that allows complete explosion in the engine 14. The minimum revolution speed regarding complete explosion is a minimum revolution speed that allows stable self-driven revolution of the engine 14 based on complete explosion. In this embodiment, the complete explosion minimum revolution speed is about 750 rpm, although it varies depending on the characteristics of the engine 14.

In step S2, which is executed when the engine start request is output, the engine 14 is cranked, i.e., turned, with a maximum torque through the use of the starter 70 to quickly increase the engine revolution speed Ne. At this state, the fuel injection control of the engine 14 is not performed, but the degree of valve opening $\theta_{TH}$ of the electronic throttle valve 72 is kept, for example, at about an idle degree of valve opening. In step S3, it is determined whether the input shaft rotation speed Nin is at most a predetermined constant value $\alpha$. If the input shaft rotation speed Nin is less than or equal to the constant value $\alpha$, the process starting at step S4 is executed. If the input shaft rotation speed Nin is greater than the constant value $\alpha$, the process starting at step S9 is executed. Step S3 is provided for determining whether it is possible to quickly increase the engine revolution speed Ne to a synchronous revolution speed. In this embodiment, the input shaft rotation speed Nin equals the synchronous revolution speed, so that the constant value $\alpha$ is set to a maximum revolution speed that allows the engine revolution speed Ne to be quickly increased based on the torque characteristic of the starter 70 and the like.

If $Nin \leq \alpha$, the engine revolution speed Ne can be increased to the synchronous revolution speed by the starter 70. Therefore, in step S4, it is determined whether the engine revolution speed Ne is at least a predetermined value $\beta$. Step S4 is provided for determining whether to start a feedback control for equalizing the engine revolution speed Ne increased due to the craning performed by the starter 70 with the maximum torque, with the input shaft rotation speed Nin, which is the synchronous revolution speed. The predetermined value $\beta$ is set to, for example, a constant value of about 800 to 1000 rpm that is lower than a minimum revolution speed that can be a synchronous revolution speed, or a revolution speed that is lower than the actual input shaft rotation speed Nin by a predetermined revolution speed e.g., about 400 to 500 rpm, etc.

While the engine revolution speed Ne is lower than the predetermined value $\beta$, the engine 14 is cranked with the maximum torque of the starter 70. When the engine revolution speed Ne becomes equal to or greater than the predetermined value $\beta$, the torque of the starter 70 is feedback-controlled in step S5 so as to achieve Ne=Nin. In step S6, it is determined whether engagement of the second clutch C2 has been completed, based on the oil pressure $P_{C2}$ of the hydraulic control circuit 24, a command value for the linear solenoid valve 40 that controls the oil pressure $P_{C2}$, etc. After the engagement of the second clutch C2 has been completed, that is, after the engine 14 has been connected to the drive wheels 52 via the planetary gear unit 18 and the clutches C1, C2, the process proceeds to step S7. In step S7, the fuel injection control of the engine 14 is started so as to cause self-driven revolution of the engine 14 based on explosion, and at the same time, the degree of throttle valve opening $\theta_{TH}$ is controlled in accordance with the accelerator operation amount $\theta ac$. At this moment, the engine revolution speed Ne, that is, the input shaft rotation speed Nin, is at least 1000 rpm, which is higher than the complete explosion minimum revolution speed of the engine 14. Therefore, upon supply of fuel, the engine 14 immediately achieves complete explosion and therefore stable self-driven revolution, so that a drive power corresponding to the amount of output requested by the driving person can be produced. Then, in step S8, the torque of the starter 70 is set to "0".

Figure 7A:
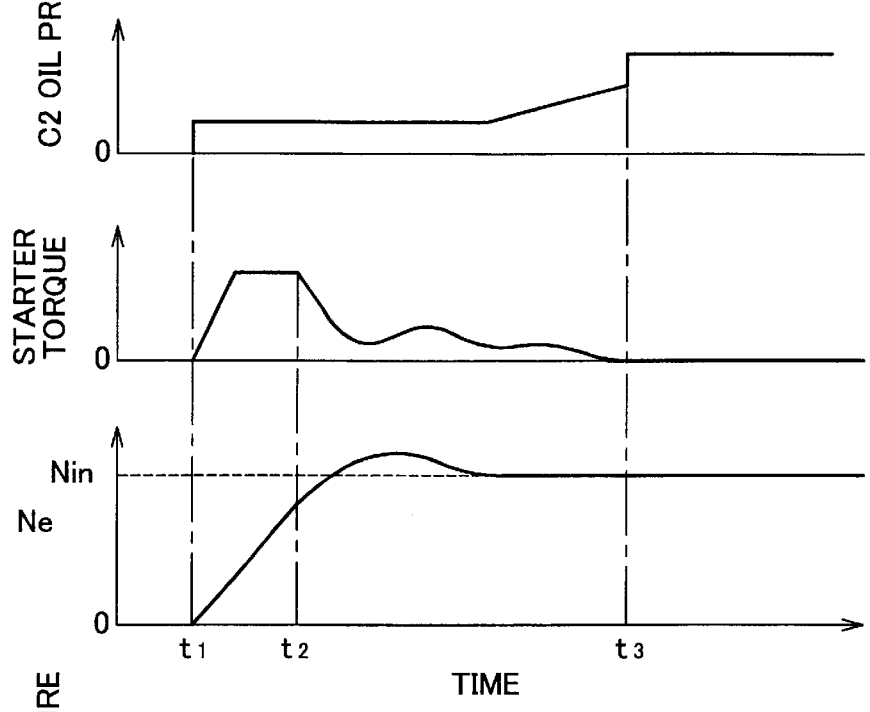
FIG. 7a is a chart showing how a synchronizing control process is performed so as to equalize the engine revolution speed Ne with the input shaft rotation speed Nin.

FIG. 7a is a time chart regarding the starting of the engine 14 achieved by cranking through the use of the starter 70 in accordance with steps S1 to S8. In the time chart, $t_1$ is a time point when the determination in step S1 becomes affirmative (YES) due to output of the engine start request, and $t_2$ is a time point when the engine revolution speed Ne reaches the predetermined value $\beta$. As a result, the determination in step S4 becomes affirmative. In FIG. 7a, $t_3$ is a time point when the engagement of the second clutch C2 is completed, and therefore the determination in step S6 becomes affirmative. Simultaneously with the engine start request (time point $t_1$), the second clutch C2 is supplied with hydraulic oil by a first fill (initial supply) up to a state that is immediately prior to generation of engagement torque. Subsequently when the engine revolution speed Ne becomes substantially equal to the input shaft rotation speed Nin, the engagement control starts, so that the oil pressure $P_{C2}$ is gradually increased by the linear solenoid valve 40.

Conversely, if $Nin > \alpha$, that is, if it is difficult to quickly increase the engine revolution speed Ne to the synchronous revolution speed through the use of the starter 70, step S3 is followed by step S9, in which the fuel injection control of the engine 14 is started so as to achieve self-driven revolution based on explosion. Subsequently in step S10, the torque of the starter 70 is set to "0". In step S11, the engine 14 is feedback-controlled so that the engine revolution speed Ne becomes equal to the input shaft rotation speed Nin, that is, the synchronous revolution speed. More specifically, the engine torque is controlled by, for example, the opening/closing control of the electronic throttle valve 72. However, depending on the input shaft rotation speed Nin, the engine torque may be controlled by an ignition timing retarding control, with the electronic throttle valve 72 being completely closed. A control may also be performed by applying a revolution resistance to the engine 14 through an electric power generating control of the starter 70 so that the engine revolution speed Ne becomes equal to the input shaft rotation speed Nin.

In step S12, it is determined whether the engagement of the second clutch C2 has been completed, as in step S6. After the engagement of the second clutch C2 is completed, that is, after the engine 14 is connected to the drive wheels 52 via the planetary gear unit 18 and the clutches C1, C2, the degree of throttle valve opening $\theta_{TH}$ is controlled in accordance with the accelerator operation amount $\theta ac$ in step S13. Therefore, a drive power corresponding to the amount of output requested by a driving person can be produced.

Figure 7B:
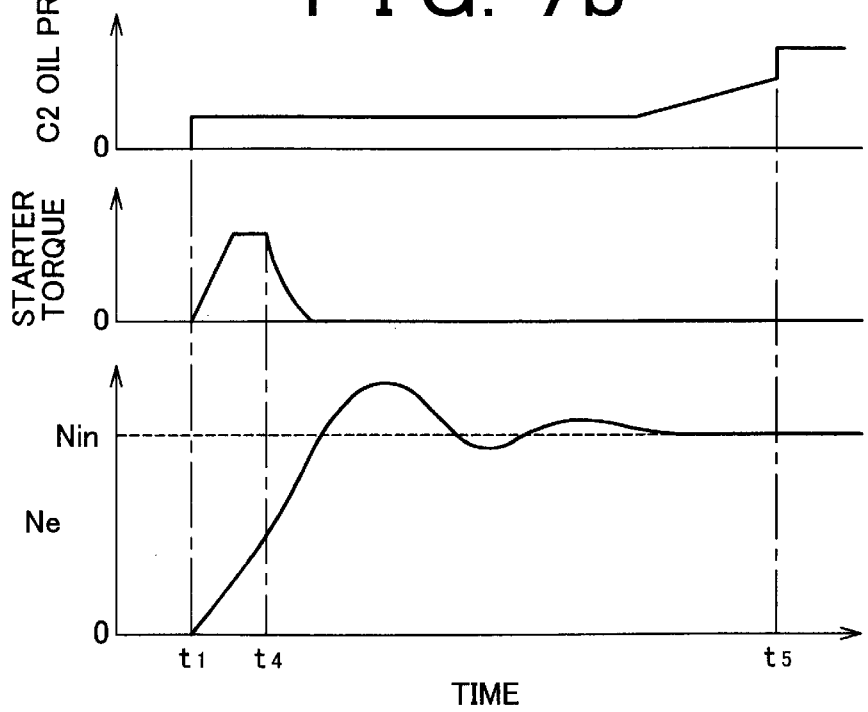
FIG. 7b is a chart showing how another synchronizing control process is performed so as to equalize the engine revolution speed Ne with the input shaft rotation speed Nin.

FIG. 7b is a chart regarding the synchronization achieved through self-driven revolution of the engine 14 based on explosion caused by executing the process starting at step S9 subsequently to step S3. In FIG. 7b, $t_1$ is a time point when the determination in step S1 becomes affirmative (YES) due to output of the engine start request, and $t_4$ is a time point when the engine 14 starts self-driven revolution due to the fuel injection control in step S9. $t_5$ is a time point when the engagement of the second clutch C2 is completed and therefore the determination in step S12 becomes affirmative.

According to the hybrid drive control apparatus 10, when an engine start request is output in order to use the engine 14 as a drive power source during the forward running of the vehicle in the motor run mode (forward), that is, during the running of the vehicle in an engine stopped state where the first clutch C1 is engaged and the second clutch C2 and the first brake B1 are released and the engine 14 is stopped, the engine 14 is cranked by the starter 70 without supply of fuel to the engine 14, and the torque of the starter 70 is controlled so that the engine revolution speed Ne becomes equal to the input shaft rotation speed Nin, i.e., synchronous revolution speed. After Ne=Nin is achieved and the engagement of the second clutch C2 is completed, that is, after the engine 14 is connected to the drive wheels 52 via the planetary gear unit 18 and the clutches C1, C2, the fuel injection control of the engine 14 is started in step S7 to cause self-driven revolution based on explosion. Therefore, the hybrid drive control apparatus 10 eliminates the problems associated with wasteful fuel consumption not contributing to the running of the vehicle and the corresponding production of exhaust gas.

Since the engine 14 is cranked by using the starter 70, electric energy is consumed. However, the consumption of electric energy does not necessarily lead to consumption of fuel or production of exhaust gas. For example, electric energy can be recovered through the regenerative control of the motor generator 16 during the running of the vehicle. Hence, the consumption of fuel and the production of exhaust gas can be reduced in total.

Furthermore, the engine 14 is turned by the starter 70 without being caused to have explosion, and the torque of the starter 70 is feedback-controlled so that the engine revolution speed Ne becomes equal to the input shaft rotation speed Nin. Therefore, there is no problem of torque fluctuation of the engine 14 caused by explosion, and the revolution speed control by the starter 70 can be performed with high responsiveness and good precision. As is apparent from FIGS. 7a and 7b, the time point $t_3$ at which the synchronization is completed, that is, the engagement of the second clutch C2 is completed, becomes earlier than the time point $t_5$. Thus, drive power from the engine 14 can be quickly obtained.

Since the time required before the synchronization is achieved is shortened as described above, the electric energy consumed by the starter 70 to start the engine is reduced. With regard to extraction of electric energy achieved by turning the motor generator 16 through the use of the engine 14, the consumption of fuel and the production of exhaust gas can be reduced in comparison with, for example, a case where the synchronization is achieved based on self-driven revolution of the engine 14 as in step S9 to S13. The extent of reduction varies depending on the power generation efficiency, the charging/discharging efficiency of the battery 42, etc. In particular, if the engine revolution speed Ne is controlled by the ignition timing retarding control, the fuel consumption efficiency remarkably deteriorates. However, the use of the starter 70 for the synchronization considerably improves the energy efficiency.

Furthermore, the request for starting the engine 14 monitored in step S1 is outputted only when the input shaft rotation speed Nin, which is the synchronous revolution speed for the engine 14, is equal to or greater than 1000 rpm, which is higher than the complete explosion minimum revolution speed of the engine 14. Therefore, when the second clutch C2 is connected after the engine revolution speed Ne becomes approximately equal to the input shaft rotation speed Nin, the revolution speed of the engine 14 is always greater than or equal to the complete explosion minimum revolution speed. Hence, when fuel is supplied to the engine 14, the engine 14 immediately has complete explosion and achieves self-driven revolution. Consequently, there is no danger of wasteful consumption of fuel caused by a failure in promptly achieving self-driven revolution despite supply of fuel to the engine 14.

According to the vehicular engine start control apparatus and the control method thereof as described above, when a request for starting the internal combustion engine occurs during the running of the vehicle in an engine stopped state where the power connection/disconnection mechanism is disconnected and the engine is stopped, the engine is turned by operating the starter electric motor without causing explosion in the engine. Furthermore, the starter electric motor is controlled so that the input and output rotation speeds of the power connection/disconnection mechanism become substantially synchronous. After the power connection/disconnection mechanism is connected subsequently to synchronization of the input and output rotation speeds of the power connection/disconnection mechanism, that is, after the engine is connected to the drive wheels via the power connection/disconnection mechanism, fuel is supplied to the engine to cause self-driven revolution of the engine based on explosion. Therefore, the problems associated with wasteful consumption of fuel not contributing to the running of the vehicle and the corresponding production of exhaust gas are eliminated. Since the internal combustion engine is turned by the starter electric motor, electric energy is consumed. However, the consumption of electric energy does not necessarily lead to consumption of fuel or production of exhaust gas. For example, electric energy can be recovered through the regenerative control of the motor generator during the running of the vehicle. Hence, the consumption of fuel and the production of exhaust gas can be reduced in total.

Furthermore, since the internal combustion engine is turned by using the starter electric motor without causing explosion in the engine, and since the starter electric motor is controlled so that the input and output rotation speeds of the power connection/disconnection mechanism become substantially synchronous, there is no problem of torque fluctuation of the engine caused by explosion. Furthermore, the revolution speed control by the starter electric motor can be performed with high responsiveness and good precision. Therefore, the time required prior to the synchronization is shortened, and drive power from the engine can be quickly obtained.

Furthermore, the request for starting the internal combustion engine is made only if the revolution speed of the engine that occurs at the time of synchronization of the input and output rotation speeds of the power connection/disconnection mechanism is equal to or greater than the complete explosion minimum revolution speed. Accordingly, when the power connection/disconnection mechanism is connected after the synchronization of the input and output rotation speeds, the revolution speed of the engine is always greater than or equal to the complete explosion minimum revolution speed. Therefore, when fuel is supplied to the engine, the engine immediately has complete explosion and achieves self-driven revolution. Hence, there is no danger of wasteful consumption of fuel caused by a failure in promptly achieving self-driven revolution despite supply of fuel to the engine.

In the illustrated embodiments, the controller is implemented with a general purpose processor. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to what are preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicular engine start control apparatus comprising:
   an internal combustion engine that propels a vehicle by turning a wheel via a power connection/disconnection mechanism;
   a starter electric motor that turns the internal combustion engine when the internal combustion engine is to be started; and
   a control unit that, when a request for starting the internal combustion engine occurs during a run of the vehicle in an engine stopped state where the power connection/disconnection mechanism is disconnected and the internal combustion engine is stopped, turns the internal combustion engine by using the starter electric motor without causing explosion in the internal combustion engine, and controls the starter electric motor so that an input rotation speed of the power connection/disconnection mechanism and an output rotation speed of the power connection/disconnection mechanism become substantially synchronous, and that performs a control of causing the internal combustion engine to have a self-driven revolution based on explosion by supplying a fuel to the internal combustion engine after the input rotation speed and the output rotation speed of the power connection/disconnection mechanism become substantially synchronous and the power connection/disconnection mechanism is connected,
   wherein the control unit increases an engine revolution speed of the internal combustion engine by causing the internal combustion engine to have a self-driven revolution based on explosion by immediately supplying fuel to the internal combustion engine without the control by the starter electric motor, in a case where the synchronous revolution speed of the internal combustion engine at which the input rotation speed of the power connection/disconnection mechanism and the output rotation speed of the power connection/disconnection mechanism become substantially synchronous is greater than a predetermined value α up to which the starter electric motor is able to increase the revolution speed of the internal combustion engine.

2. The vehicular engine start control apparatus according to claim 1, wherein the request for starting the internal combustion engine is made limitedly when a revolution speed of the internal combustion engine occurring when the input rotation speed and the output rotation speed of the power connection/disconnection mechanism become substantially synchronous is at least a complete explosion minimum revolution speed of the internal combustion engine.

3. The vehicular engine start control apparatus according to claim 2, wherein only if the output rotation speed of the power connection/disconnection mechanism is at most a predetermined rotation speed when the request for starting the internal combustion engine occurs, the control unit turns the internal combustion engine without causing explosion in the internal combustion engine, and causes the internal combustion engine to have the self-driven revolution based on explosion by supplying the fuel to the internal combustion engine after the power connection/disconnection mechanism is connected.

4. The vehicular engine start control apparatus according to claim 3, wherein the control unit causes the power connection/disconnection mechanism to be engaged and causes the internal combustion engine to have the self-driven revolution based on explosion by supplying the fuel to the internal combustion engine when a revolution speed of the internal combustion engine is at least a predetermined internal combustion engine revolution speed.

5. The vehicular engine start control apparatus according to claim 4, further comprising a drive electric motor that propels the vehicle by turning the wheel,
   wherein the vehicle is propelled by the drive electric motor when the internal combustion engine is stopped, and the vehicle is propelled by driving only the internal combustion engine or by cooperatively driving the internal combustion engine and the drive electric motor after the power connection/disconnection mechanism is engaged.

6. The vehicular engine start control apparatus according to claim 1, wherein if the output rotation speed of the power connection/disconnection mechanism is above a predetermined rotation speed, the control unit causes the internal combustion engine to have the self-driven revolution based on explosion by supplying the fuel to the internal combustion engine before the power connection/disconnection mechanism is connected.

7. The vehicular engine start control apparatus according to claim 6, wherein the control unit sets an output torque of the starter electric motor substantially to zero after the internal combustion engine has a self-driven revolution, and performs a control of supplying the fuel to the internal combustion engine so that the revolution speed of the internal combustion engine becomes substantially synchronous with the output rotation speed of the power connection/disconnection mechanism, and then engages the power connection/disconnection mechanism after the input and output rotation speeds of the power connection/disconnection mechanism become substantially synchronous.

8. The vehicular engine start control apparatus according to claim 1, further comprising a drive electric motor that propels the vehicle by turning the wheel,
   wherein the vehicle is propelled by the drive electric motor when the internal combustion engine is stopped, and the vehicle is propelled by driving only the internal combustion engine or by cooperatively driving the internal combustion engine and the drive electric motor after the power connection/disconnection mechanism is engaged.

9. A vehicular engine start control apparatus comprising:
an internal combustion engine that propels a vehicle by turning a wheel through a power connection/disconnection mechanism;
a starter electric motor that turns the internal combustion engine when the internal combustion engine is to be started;
a synchronous controller that turns the internal combustion engine by using the starter electric motor without causing explosion in the internal combustion engine, and controls the starter electric motor so that an input rotation speed of the power connection/disconnection mechanism and an output rotation speed of the power connection/disconnection mechanism become substantially synchronous, when a request for starting the internal combustion engine occurs during a run of the vehicle in an engine stopped state where the power connection/disconnection mechanism is disconnected and the internal combustion engine is stopped; and
a post-connection engine starter that causes the internal combustion engine to have a self-driven revolution based on explosion by supplying a fuel to the internal combustion engine after the input rotation speed and the output rotation speed of the power connection/disconnection mechanism become substantially synchronous and the power connection/disconnection mechanism is connected,
wherein the control unit increases an engine revolution speed of the internal combustion engine by causing the internal combustion engine to have a self-driven revolution based on explosion by immediately supplying fuel to the internal combustion engine without the control by the starter electric motor, in a case where the synchronous revolution speed of the internal combustion engine at which the input rotation speed of the power connection/disconnection mechanism and the output rotation speed of the power connection/disconnection mechanism become substantially synchronous is greater than a predetermined value $\alpha$ up to which the starter electric motor is able to increase the revolution speed of the internal combustion engine.

10. The vehicular engine start control apparatus according to claim 9, wherein the request for starting the internal combustion engine is made limitedly when a revolution speed of the internal combustion engine occurring when the input rotation speed and the output rotation speed of the power connection/disconnection mechanism become substantially synchronous is at least a complete explosion minimum revolution speed of the internal combustion engine.

11. The vehicular engine start control apparatus according to claim 10, further comprising a drive electric motor that propels the vehicle by turning the wheel,
wherein the vehicle is propelled by the drive electric motor when the internal combustion engine is stopped, and the vehicle is propelled by driving only the internal combustion engine or by cooperatively driving the internal combustion engine and the drive electric motor after the power connection/disconnection mechanism is engaged.

12. The vehicular engine start control apparatus according to claim 9, further comprising a drive electric motor that propels the vehicle by turning the wheel,
wherein the vehicle is propelled by the drive electric motor when the internal combustion engine is stopped, and the vehicle is propelled by driving only the internal combustion engine or by cooperatively driving the internal combustion engine and the drive electric motor after the power connection/disconnection mechanism is engaged.

13. A control method of a vehicular engine start control apparatus including an internal combustion engine that propels a vehicle by turning a wheel via a power connection/disconnection mechanism, and a starter electric motor that turns the internal combustion engine when the internal combustion engine is to be started, the control method comprising:
turning the internal combustion engine by using the starter electric motor without causing explosion in the internal combustion engine, when a request for starting the internal combustion engine occurs during a run of the vehicle in an engine stopped state where the power connection/disconnection mechanism is disconnected and the internal combustion engine is stopped;
controlling the starter electric motor so that an input rotation speed of the power connection/disconnection mechanism and an output rotation speed of the power connection/disconnection mechanism become substantially synchronous;
connecting the power connection/disconnection mechanism;
causing the internal combustion engine to have a self-driven revolution based on explosion by supplying a fuel to the internal combustion engine, and
increasing an engine revolution speed of the internal combustion engine by causing the internal combustion engine to have a self-driven revolution based on explosion by immediately supplying fuel to the internal combustion engine without the control by the starter electric motor, in a case where the synchronous revolution speed of the internal combustion engine at which the input rotation speed of the power connection/disconnection mechanism and the output rotation speed of the power connection/disconnection mechanism become substantially synchronous is greater than a predetermined value $\alpha$ up to which the starter electric motor is able to increase the revolution speed of the internal combustion engine.

14. The control method according to claim 13, wherein the request for starting the internal combustion engine is made limitedly when a revolution speed of the internal combustion engine occurring when the input rotation speed and the output rotation speed of the power connection/disconnection mechanism become substantially synchronous is at least a complete explosion minimum revolution speed of the internal combustion engine.

15. The control method according to claim 14, wherein only if the output rotation speed of the power connection/disconnection mechanism is at most a predetermined rotation speed, the internal combustion engine is caused to have the self-driven revolution based on explosion by supplying the fuel to the internal combustion engine after the power connection/disconnection mechanism is connected.

16. The control method according to claim 15, wherein the power connection/disconnection mechanism is caused to engage and the internal combustion engine is caused to have the self-driven revolution based on explosion by supplying the fuel to the internal combustion engine if a revolution speed of the internal combustion engine is at least a predetermined internal combustion engine revolution speed.

17. The control method according to claim 13, further comprising:
- setting an output torque of the starter electric motor substantially to zero after the internal combustion engine has a self-driven revolution;
- performing a control of supplying the fuel to the internal combustion engine so that a revolution speed of the internal combustion engine becomes substantially synchronous with the output rotation speed of the power connection/disconnection mechanism; and
- engaging the power connection/disconnection mechanism after the input and output rotation speeds of the power connection/disconnection mechanism become substantially synchronous.

* * * * *